United States Patent [19]

Bruns

[11] Patent Number: 4,640,214
[45] Date of Patent: Feb. 3, 1987

[54] MODULAR MULTI-STORAGE BUILDING

[76] Inventor: John H. Bruns, 8251 SE. 26th Ave., Mercer Island, Wash. 98040

[21] Appl. No.: 692,770

[22] Filed: Jan. 18, 1985

[51] Int. Cl.$^4$ .............................................. B63B 35/44
[52] U.S. Cl. ...................................... 114/263; 52/79.4; 52/236.3; 52/DIG. 10; 114/258; 414/263; 414/267; 405/219
[58] Field of Search ............... 114/263, 264, 258, 125, 114/266; 52/236.2, 236.3, 236.4, 174, 79.3, 79.4, DIG. 10; 414/263, 266, 267, 277; 405/218, 219

[56] References Cited

U.S. PATENT DOCUMENTS

| 1,709,914 | 4/1929 | Klanke . | |
|---|---|---|---|
| 2,566,099 | 8/1951 | Van Hulst | 20/1.1 |
| 2,924,191 | 2/1960 | Blumquist et al. | 114/266 |
| 3,287,921 | 8/1963 | Wilson | 414/277 X |
| 3,289,366 | 12/1966 | Abrams | 52/174 |
| 3,295,265 | 1/1967 | Naoto Hida | 52/82 |
| 3,358,407 | 12/1967 | Konig | 52/79 |
| 3,419,161 | 12/1968 | Hagel | 414/263 X |
| 3,419,162 | 12/1968 | Hagel | 214/16.1 |
| 3,437,218 | 4/1969 | Hagel | 214/16.1 |
| 3,474,918 | 10/1969 | Postmes et al. | 214/16.1 |
| 3,521,588 | 7/1970 | Atlas | 114/263 |
| 3,710,534 | 1/1973 | McNamara, Jr. | 52/745 |
| 3,714,304 | 1/1973 | Carner et al. | 264/94 |
| 3,733,763 | 5/1973 | Drucker | 52/126 |
| 4,067,097 | 1/1978 | Okamoto | 29/429 |
| 4,078,295 | 3/1978 | Koller | 29/429 |
| 4,136,492 | 1/1979 | Willingham | 52/79.7 |

FOREIGN PATENT DOCUMENTS

2629787  1/1978  Fed. Rep. of Germany ...... 114/258

Primary Examiner—Sherman D. Basinger
Assistant Examiner—Paul E. Salmon
Attorney, Agent, or Firm—Delbert J. Barnard

[57] ABSTRACT

A plurality of modules (66) are connected together to define a multi-story annular building (10) of honeycomb cells (C). The cells (C) of the building are hexagonal in cross section and taper horizontally as they extend radially inwardly. A turntable/elevator (36) is located in a shaft opening at or near the center of the building (10). A tunnel (48) extends through a side of the building (10). The building includes flotation cells at its bottom, some of which are air tight. Water is pumped into and out from the others, for regulating the vertical position of the building (10) in a body of water. An annular ring (66) of flotation material extends about the building (10) immediately below the water line. Each cell (C) is reinforced by a reinforcing ring (R1) extending about the girth of the cell (C). The rings (R1) are connected together vertically and horizontally to form a wall (RW1) of rings constituting a basic skeletal part of the building (10).

39 Claims, 20 Drawing Figures

Fig. 8 (EMPTY, WATER TIGHT AND VENTED)

MODULAR MULTI-STORAGE BUILDING

TECHNICAL FIELD

This invention relates to multi-story building construction. More particularly, it relates to a unique building concept, to a modular construction of the building, and to the constructional makeup of the modules.

BACKGROUND INFORMATION

Modular buildings are an old concept. For example, U.S. Pat. No. 3,710,534, granted Jan. 16, 1973, to John O. McNamara, Jr., discloses constructing a building from a plurality of right angle modules, connected together to form rectangular shaped cells. U.S. Pat. No. 3,714,304, granted Jan. 30, 1973, to John W. Carner and Frank B. Anderson, discloses constructing a building from modules which are cast with a ceiling structure and depending wall structures, but are open at the bottom. The modules are placed side-by-side horizontally and are stacked vertically to form a building. U.S. Pat. No. 3,733,763, granted May 22, 1973 to Ernest R. Drucker discloses constructing a building from modules which are separate units of the building, e.g. separate apartments. U.S. Pat. No. 4,136,492, granted Jan. 30, 1979 to John H. Willingham, discloses constructing a modular building from T-shaped modules.

It is also known to construct multi-story circular buildings composed of a plurality of rooms or units positioned about a center shaft or chamber. For example, the aforementioned U.S. Pat. No. 4,136,492 discloses (FIGS. 40 and 41) locating a plurality of rooms about a center stairwell. The rooms are constructed from T-shaped modules, each of which has a flat roof, a flat floor and flat sidewalls. The sidewalls extend radially, so each room narrows down from its outside end to its inside end. The aforementioned U.S. Pat. Nos. 3,714,304 and 3,733,763 also discloses buildings composed of units positioned about a center space. Additional buildings of this general type are disclosed by the following U.S. Pat. Nos.: 1,709,914, granted Apr. 23, 1929 to Elmer R. Klanke; 3,295,265, granted Jan. 3, 1967 to Naoto Hida; 3,358,407; granted Dec. 19, 1967, to Bruno Konig; 3,419,161, granted Dec. 31, 1968, to Carl H. Hagel; 3,419,162, granted Dec. 31, 1968, to Carl H. Hagel; 3,437,218, granted Apr. 8, 1969 to Carl H. Hagel; and 3,474,918, granted Oct. 28, 1969, to Antonius J. M. F. Postmes and Cornelis M. Wennekes.

DISCLOSURE OF THE INVENTION

Building structures constructed in accordance with one aspect of the present invention are basically characterized by a plurality of hexahedral building cells joined together in honeycomb juxtaposed. In preferred form, each cell narrows in width from a first end to a second end. Each cell is defined by a pair of spaced apart vertical sidewalls which converge together as they extend from the first to the second end of the cell. Each cell further includes a pair of top sections which extend laterally of the cell and slope upwardly and inwardly from the sidewalls to an apex whereat they are connected together and a pair of bottom sections which extend laterally on the cell and slope downwardly and inwardly from the vertical sidewalls to a valley whereat they meet and are connected together. Each vertical sidewall has an inboard end which is spaced inwardly from the second end of the cell. Upper and lower cantilever beams project from the inboard ends of each sidewall towards the second end of the cell. The region located vertically between the upper and lower cantilever beams, and horizontally between the inboard end of the vertical wall and the second end of the cell is an open region.

In preferred form, a reinforcement ring is provided in each cell in the region of the inboard ends of the vertical sidewalls. The reinforcement ring extends about the girth of the cell and comprises thickened portions of the sidewalls, the top sections and the bottom sections.

The reinforcement rings for the several cells are connected together to form a reinforcement ring of rings for a single tier of cells and a cylinder wall of rings for a multi-tier structure.

In preferred form, a second reinforcing ring is located between the first reinforcing ring and the first end of the cell.

Also in preferred form, the building structure is constructed from a mosaic of substantially identical building units or modules. In preferred form, each building unit comprises one of the vertical sidewalls of the cell, an upper dihedral portion and a lower dihedral portion. Each cell is defined by portions of four of these cell units. The top of the cell is formed by a lower dihedral portion of a first building unit and adjoining side portions of the upper dihedral portions of second and third building units. The bottom is formed by the upper dihedral portion of a fourth building unit and adjoining side portions of the lower dihedral unit of the second and third building units. The sidewalls are formed by vertical wall portions of the second and third building units.

Also in preferred form, each such building unit comprises an end wall at the first end of the cell and a section of the walkway positioned outwardly of the end wall. An access opening (with door) is provided in the end wall, to provide an avenue between the inside of the cell and the walkway.

In accordance with an aspect of the invention, an annular building is provided which includes a vertically elongated central opening in which a turntable/elevator is located. The structure may be used for storing boats in which case it is preferably located within a body of water and the building is constructed to include a passageway through the building extending between the body of water surrounding the building and the center opening. A building that is set into a body of water is constructed to include a bottom tier of flotation cells.

Additional aspects of the invention are included in the detailed description of the preferred embodiment, and in the claims. Accordingly, the detailed description and the claims constitute portions of the description of the invention.

BRIEF DESCRIPTION OF THE DRAWING

Like reference numerals are used throughout the several views of the drawing to designate like parts, and.

BEST MODE FOR CARRYING OUT THE INVENTION

Figure 1:
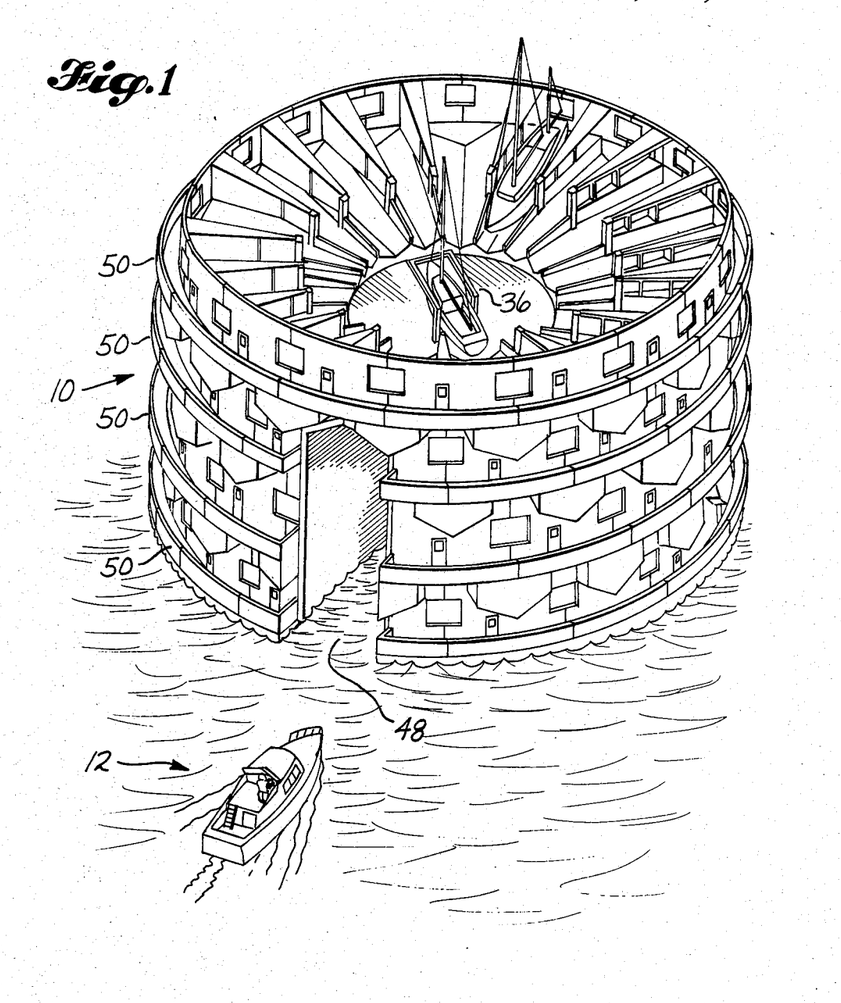
FIG. 1 is a pictorial view of an embodiment of the invention, in the form of an annular building constructed to be positioned in a body of water to serve as a boat storage facility, such view showing a boat approaching a tunnel entrance to the building, and showing a second boat on an elevator located at the center of the building, at an intermediate height, and further showing a third boat in a top level storage cell.

The embodiment shown by FIG. 1 is a multi-story building 10 of annular form shown floating in a body of water 12.

In preferred form, the building 10 is connected to a land fixed structure 14 by a truss comprising a pair of structural main links 16, 18 on or over which bridge structures 20, 22 may be constructed, and a brace link 24.

In the illustrated embodiments, the structural links 16, 18 are positioned on radial lines originating from the center of the building 10 and separated by an angle of about sixty degrees. The building end of each link 16, 18 may be a part of a universal joint 26 which includes the end portion 28 of the link 16, 18 and a complementary component 30 secured to the building 10. By way of typical and therefore nonlimitive example, the joint 26 is shown in the form of a ball and socket joint 28, 30. The opposite end of each link 16, 20 is connected to the land structure 14 by means of a universal joint 32, also shown in the form of a ball and socket joint. A universal joint 32 is provided at the opposite ends of the brace link 24. The walkways 20, 22 may be constructed in any suitable manner so that they do not interfere with any flexing action of the links 16, 18, 24.

As shown by FIG. 1, the building 10 is a multi-story or multi-tier building. Hereinafter the different levels will be referred to as "tiers". The rooms will be referred to as either "rooms" or "cells".

As previously mentioned, the preferred embodiment is annular in form and includes a center opening or shaft 34 in which an elevator/turntable structure 36 (FIG. 1) is located. The constructional details of the elevator/turntable 36 are not a part of the invention, so these details have been omitted, and the elevator/turntable 36 has been omitted from FIGS. 2 and 3. However, a general construction and arrangement of the elevator/turntable 36 is a part of an aspect of the invention and are hereinafter described in some detail.

Figure 5:
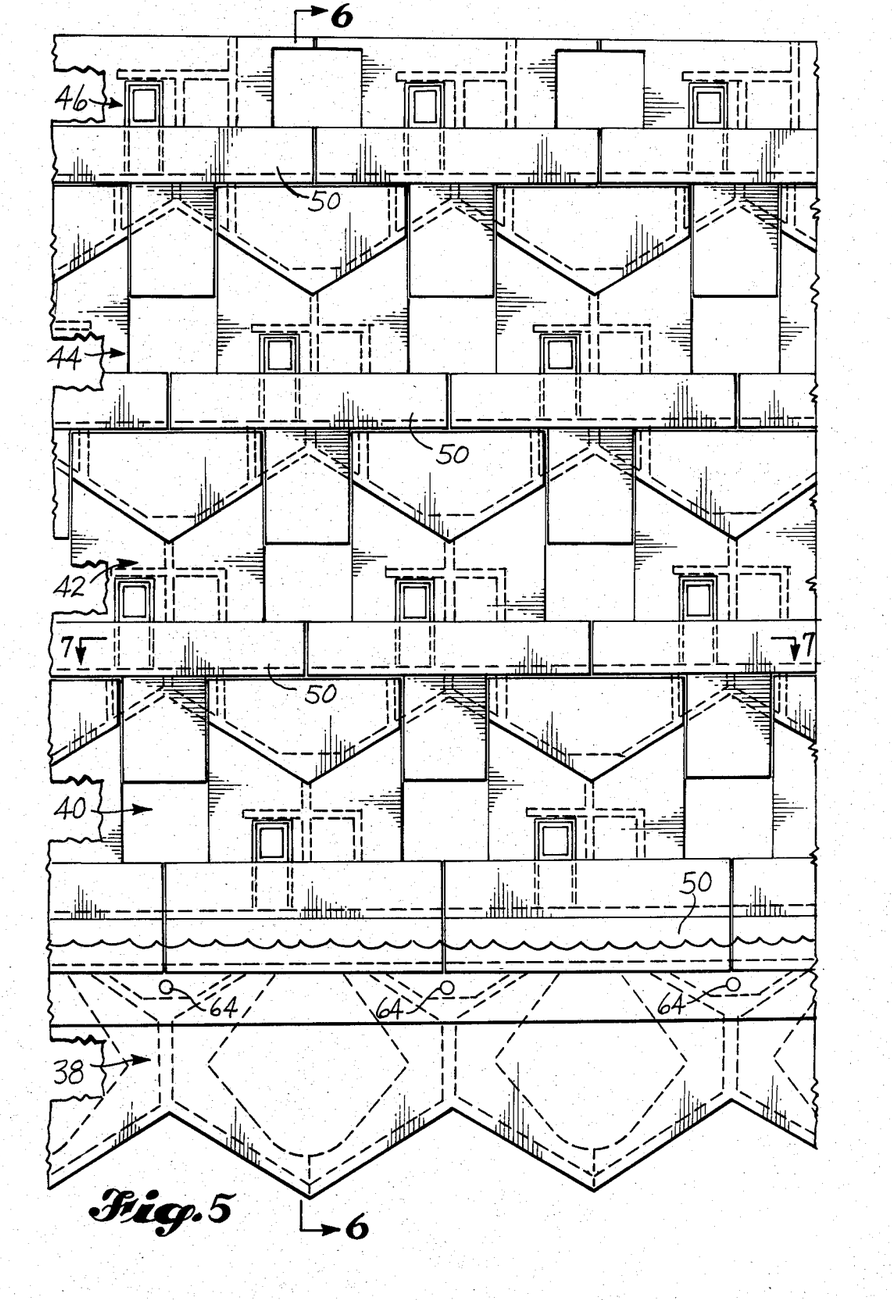
FIG. 5 is a side elevational view of the side portion of the structure shown by FIG. 1 developed on a plane.

The bottom or first tier is a flotation tier 38 (FIG. 5). The next tier up, designated 40 is a storage tier for wooden boats. The third and fourth tiers 42, 44 are storage tiers for plastic boats. The top tier 46 is a storage tier for sailboats.

Referring again to FIG. 1, a tunnel opening 48 extends laterally through a side porton of the building 10, to provide an avenue of travel into and out from the center shaft 34. In preferred form, the tunnel 48 is positioned diametrically opposite a radial line which is halfway between the two links 16, 18. In preferred form, the tunnel 48 would be positioned to face into or out of the direction of worst wind. Also, the building 10 would be well ventilated with windows, in the form of screened openings, as a way of reducing the tendency of the building to create a Von Karman vortex tail.

Each tier is provided with a walkway 50 which extends around the building except for the location of the tunnel 48. Referring again to FIG. 2, an elevator 52 may be provided on the shore side of the building 10, between the two walkways 20, 22. The elevator 52 is per se not a part of the invention and so it is illustrated only generally.

In use, boats would enter and leave the building 10 via the tunnel 48. For example, a boat coming into the building 10 would enter via the tunnel 48 and would be met at water level by the elevator/turntable 36. The boat would be positioned on the elevator/turntable, in any suitable manner, and then the elevator/turntable 36 would be rotated and/or elevated in order to align the boat with its storage cell. In preferred form, the boat would be positioned on a translator structure which would be movable from the elevator into and out from the storage cell. The translator is not a part of the invention and for this reason has not been illustrated.

Figures 2, 3:
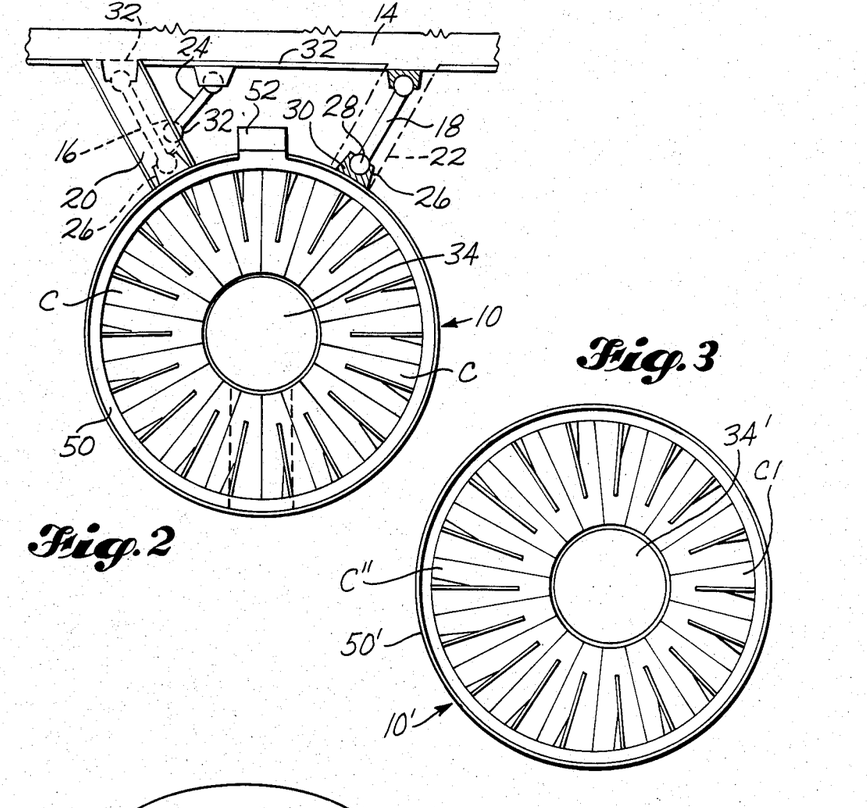
FIG. 2 is a top plan view of the boat storage facility of FIG. 1, minus the elevator, but including a diagrammatic showing of a way of connecting the structure to a land abutment.
FIG. 3 is a view like FIG. 2, but showing an off-center placement of a center access shaft for the purpose of producing several sizes of storage cells.

FIG. 3 shows a variant in the construction of the building. In this figure the building is designated 10'. It differs from building 10 in that the shaft 34' is offset from the geometric center of the building 10'. This results in some relatively short storage cells C' being located on one side of the building 10' and some relatively large storage cells C'' located on the opposite side of the building 10'. The intermediate cells are graduated in size between the small and large cells. The shore connection and the tunnel location have been omitted from FIG. 3 as the purpose of FIG. 3 was merely to show the variation in center shaft placement for the purpose of creating a plurality of sizes of the storage cells.

Figure 4:
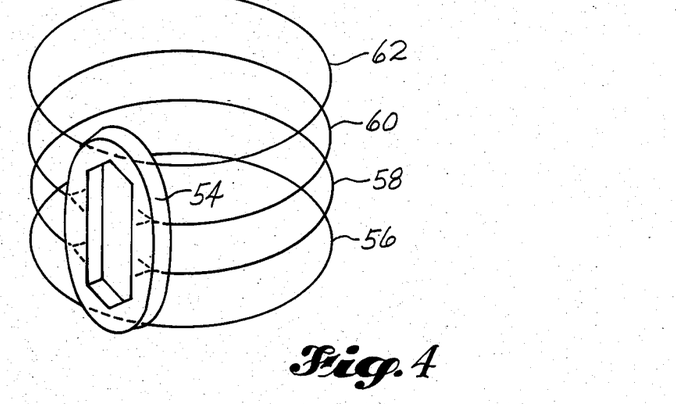
FIG. 4 is a free form diagram of a system of post-tensioning cables and a massive structural ring surrounding the tunnel to which some of the cables are attached.

FIG. 4 is a free form diagram of a post-tension cable system used for reinforcing the building structure 10. This figure will be discussed later in more detail. At the present time it is sufficient to say that the building 10 includes a vertically elongated frame 54 which is a part of the structure defining the tunnel 48. Each of the tiers 38, 40, 42, 44 includes a plurality of rings of post-tensioning cables which are connected at their opposite to the frame structure 54. In FIG. 4 the post-tensioning cables for the lower tier 38 are represented by a single circle designated 56. The post-tension cables for the tier 40 are represented by a single circle designated 58. The post-tensioning cables for the tier 42 are represented by a single circle designated 60. The post-tensioning cables for the tier 44 are represented by a single circle designated 62.

Figure 6:
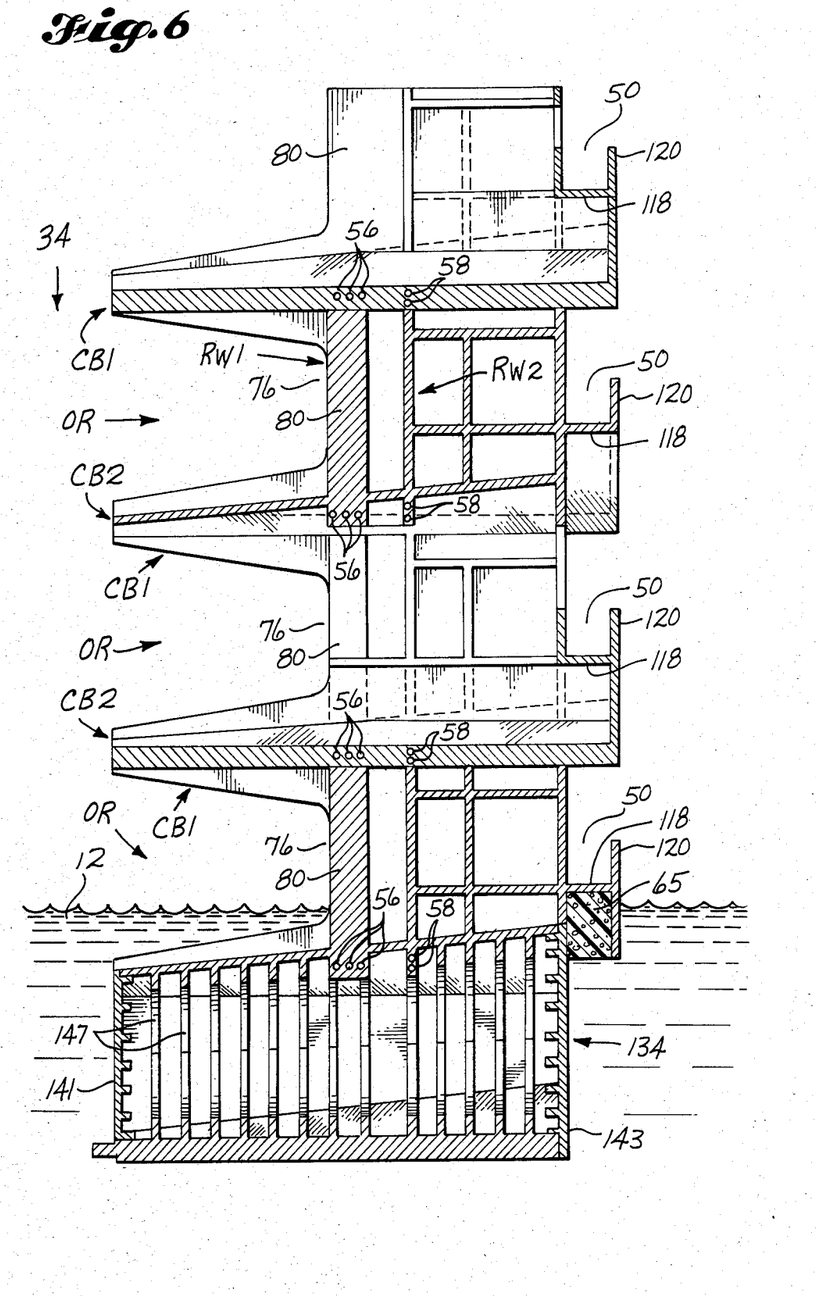
FIG. 6 is a vertical sectional view taken substantially along line 6—6 of FIG. 5.

Referring to FIGS. 5 and 6, the building 10 is constructed to float in the body of water 12 in a position placing the lower portions of the cells C of the second tier 40 under water. The outer wall of the building 10 is provided with openings 64 for allowing water into the cells C. An annular flotation ring 65 is provided around the building 10, below the bottom walkway 50. A flotation control system which includes this flotation ring 65 and the flotation tier 38 will be hereinafter discussed in some detail.

Building 10 is composed of a plurality of inwardly narrowing hexahedral cells or storage spaces C, joined together vertically and circumferentially in the manner of a honeycomb. Stated another way, the cells are connected together vertically and horizontally in honeycomb juxtaposition. Building 10 is for the most part constructed from a plurality of identical building units or modules which are individually formed and are then connected together, and are combined with other building elements, to complete the building 10.

In preferred form, building 10 is basically characterized by its annular shape, the central vertical opening or elevator shaft 34, the radially extending tunnel opening 48, the bottom flotation section or tier 38, and a plurality (e.g. four) of storage levels or tiers 40, 42, 44, 46, the top one of which is uncovered.

A preferred form of building unit or module 66 will now be described. Then the rooms or cells C will be described. Then the remaining portions of the building 10 and the operation of a flotation system will be described.

FIGS. 16-19 show two additional constructions of building units or modules 68, 70. FIG. 20 shows a building unit 66, and fragmentary portions of three additional units 66, connected together to form a cell C. FIG. 20 also shows the orientation of a single building unit 68 in the cell diagram and makes it evident as to how a number of these building units 68 could be connected together to form the cells C. FIG. 20 also shows the relative position of a single building unit 70 in the cell diagram and makes it evident as to how a number of these building units 70 could be connected together to define the cells or rooms C of the building 10.

Figures 13, 14:
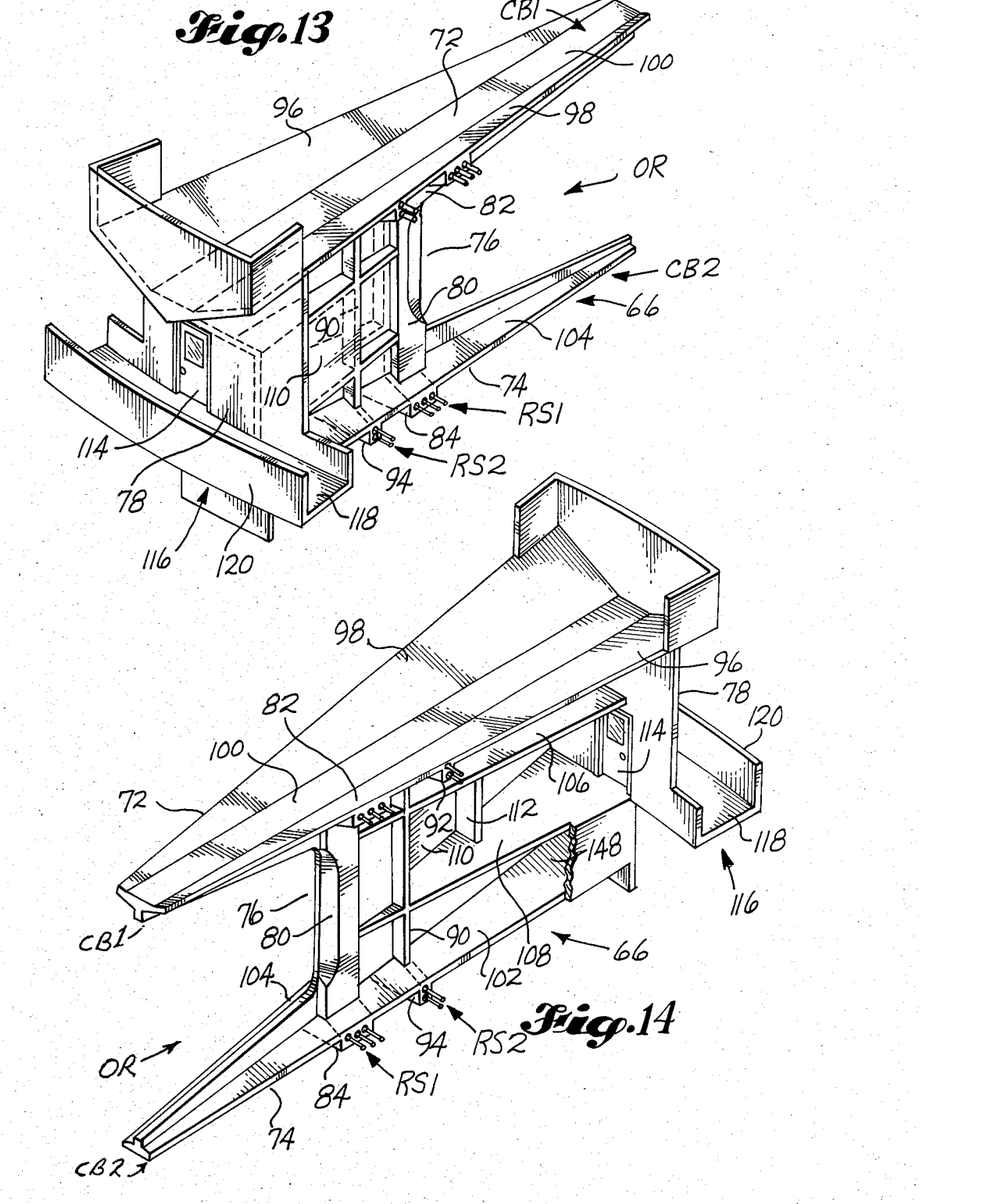
FIG. 13 is a pictorial view a preferred form of a building unit which is combinable with like or similar other building units to form the cells, such view being taken from above and looking towards the top, one side and the outer end of the building unit.
FIG. 14 is a view similar to FIG. 13, but looking toward the top, the opposite side and the inner end of the building unit.

Referring to FIGS. 13 and 14, each building unit 66 comprises an upper dihedral section 72, a lower dihedral section 74, and a vertical wall section 76 extending between and interconnecting the outboard portions of the dihedral sections 72, 74. Building unit 66 also includes an outer end wall section 78.

Figure 7:
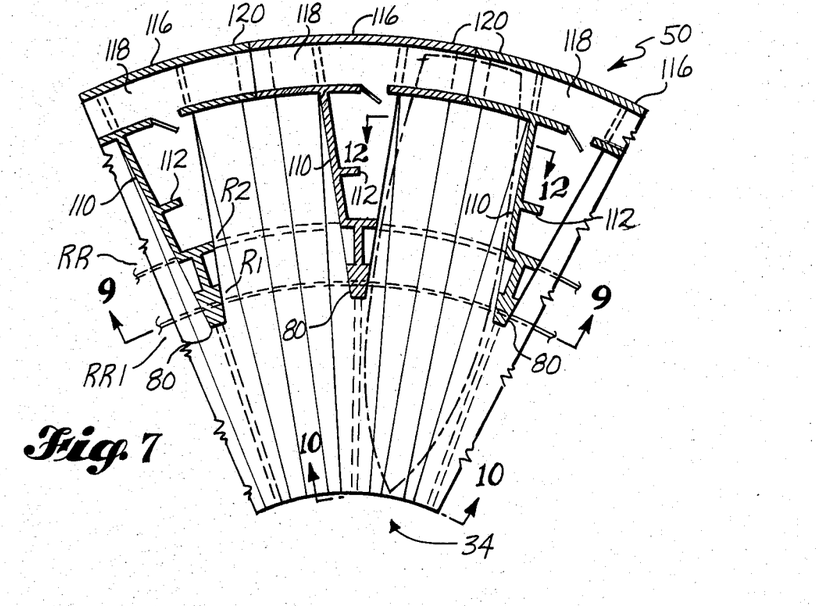
FIG. 7 is a horizontal sectional view taken substantially along line 7—7 of FIG. 5, presenting a plan view of a pair of adjoining cells.
Figure 8:
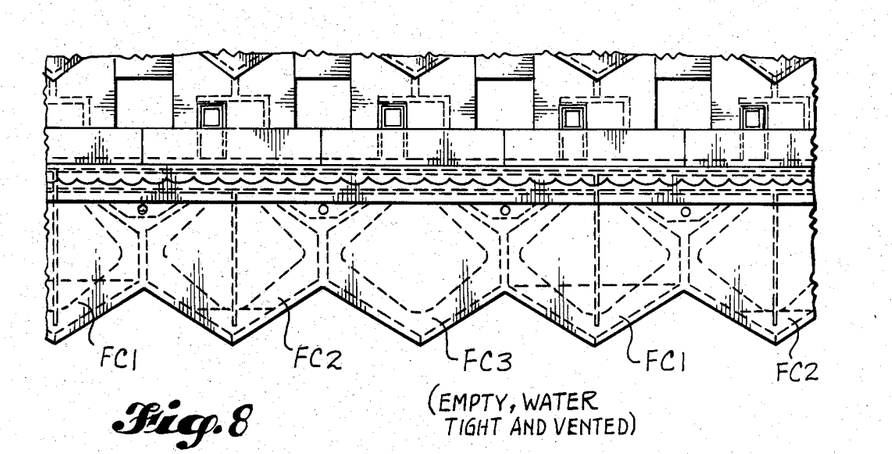
FIG. 8 is a schematic diagram of portions of a flotation level control system.

As shown by FIGS. 7, 10, 13 and 14, both sides of the inboard end of wall section 76 are thickened and the thickened region 41 extends upwardly and becomes thickened parts of the two sides of the upper dihedral 72. The lower dihedral 74 is also thickened in this region. The thickened portion 80 of the vertical wall 76 and the thickened portions 82, 84 of the upper and lower dihedrals 72, 74 together define a section of a reinforcing ring R. When a plurality of the building units 66 are joined together to form a cell C, the ring sections of such units combine to form a reinforcing ring R1 which extends about the girth of a midportion of the cell C, in the vicinity of the inboard end of the vertical section 76. When the building structure 10 is complete, the reinforcing rings R1 for each tier of cells C are connected together to form a large ring RR1 which extends circumferentially around the building 10. This larger ring RR1 lies on the circle 88 (FIG. 7).

Preferably, each building unit 66 includes a second reinforcing ring section RS2 spaced radially outwardly of the cell C from the first ring section RS1. This ring section RS2 is formed by web sections 90, 92, 94. In a completed building the ring section 90, 92, 94 together form a second cell ring R2 extending about the girth of its cell. The cell rings R2 form a second circumferential ring RR2 of cell rings R2 for each tier.

The rings RR1 of the several tiers are connected together vertically to form a reinforcement wall RW1 (FIGS. 6 and 9) of rings R1 in the region of the inboard ends of the vertical cell walls 76. In similar fashion, the rings RR2 of the several tiers, are connected together vertically to form a second reinforcement wall RW2 (FIG. 6) of rings R2.

The two side panels 96, 98 of the upper dihedral 72 meet on a level. In preferred form, a flat floor 100 extends the full length of the upper dihedral 72 and forms a narrow flat bottom for the central region of the cell.

Regardless of the building unit configuration used, it is necessary that the side boundaries of the units lie in vertical planes which extend generally radially of the building structure 10. As a result, when viewed in side elevation, the outer edges of the side panels 96, 98 of the upper dihedral 72 slope upwardly as they extend outwardly lengthwise of the cell C (see FIG. 6). The outer edges of the side panels 102, 104 of the lower dihedral 74 also slope upwardly as they extend outwardly lengthwise of the cell. Also, the intersection line between the inner edges of the side panels 102, 104 and the lower edge of vertical wall 76 slopes upwardly as it extends outwardly lengthwise of the cell. This construction gives each cell a level floor but a ceiling ridge line which slopes upwardly from the inner to the outer end of the cell C.

The portion of the upper dihedral 72 which is located inboard of the ring section RS1 combines with a vertical web extending of the vertical section 76 to form a cantilever beam CB1 (FIGS. 6, 13 and 14) projecting from the ring section RS1 towards the center opening 34. In similar fashion, a portion of the lower dihedral 74 which is inboard of the ring section RS1 and a lower web extension of the vertical section 76 form a lower cantilever beam CB2 (FIGS. 6, 13 and 14) which projects inwardly from the ring section RS1 towards the center opening 34.

Figures 10, 11, 12:
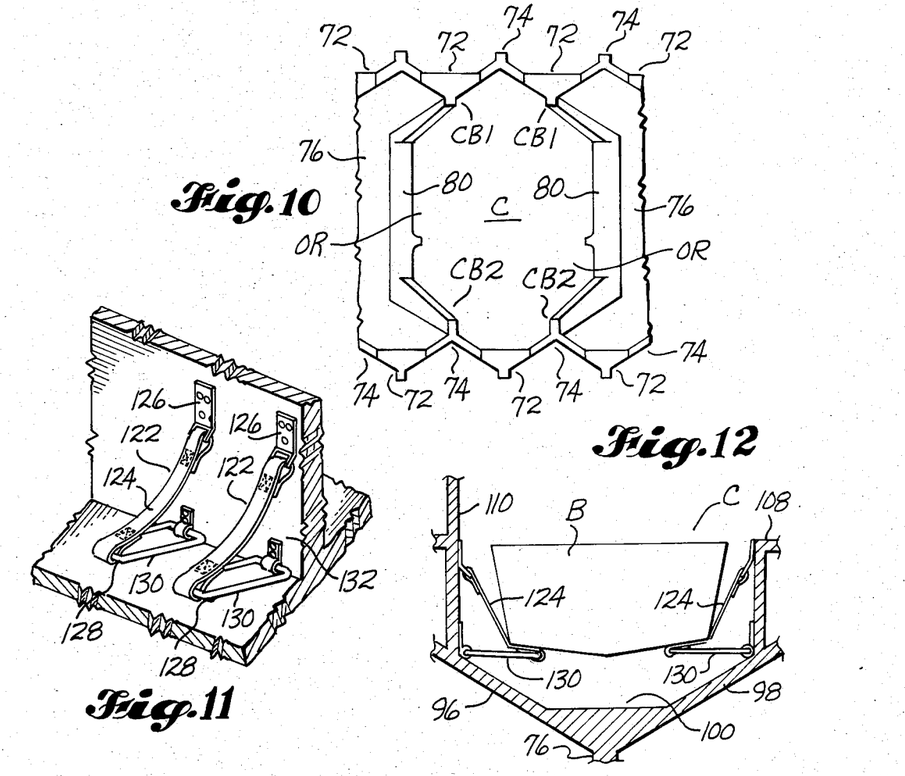
FIG. 10 is an elevational true view taken substantially along line 10—10 of FIG. 7, and looking from the open center of the structure into one of the cells.
FIG. 11 is a fragmentary view of a wall portion of a cell showing an adjoining pair of boat supports mounted on the walls.
FIG. 12 is a sectional view taken through a cell substantially along line 12—12 of FIG. 7, showing a boat in a supported position on a set of the supports.

As clearly shown by FIGS. 6, 7, 13 and 14, the region OR that is radially inwardly of the vertical wall section 76, and which is located between the upper and lower cantilever beams CB1, CB2, is an open region. As a result of the inboard vertical portions of the building units 66 being open, for each tier of cells, an annular space or chamber is defined vertically between the upper and lower cantilever beams, and radially between the center opening 34 and the ring of rings RR1. As best shown by FIGS. 2, 7 and 10, the provision of this annular space makes it possible to move structures (e.g. boats) into and out from the storage cells C which are wider than the width of the cells C at the center opening 20. Thus, owing to this construction, the effective width dimension of each storage cell is the width of the space between the two side portions 80 of the reinforcement rings R1.

As shown by FIGS. 2, 6, 7, 13 and 14, the portion of the vertical wall section 76 which is outboard of the ring RR2 may be constructed to provide storage space on one side of one of the storage cells which the wall section helps to define. The storage region may be defined by upper and lower triangular walls 106, 108, a vertical sidewall 110, and a vertical divider wall 112. In preferred form, the top and bottom walls 106, 108 are symmetrical triangles. The plane of the sidewall 110 and the edges of the top and bottom walls 106, 108 opposite wall 110 deviate from a radial line about equal amounts but on opposite sides of the radial line (FIG. 7). Vertical wall 112 divides the storage space into a small compartment on the inboard side of wall 112 and a larger compartment on the outboard side of wall 112.

Preferably, each cell unit 66 includes an outer end portion including a vertical wall section 78 provided with a door opening and a door 114. The outer end portion preferably also includes a walkway section 116 having a floor section 118 and an outer wall section 120.

Figure 15:
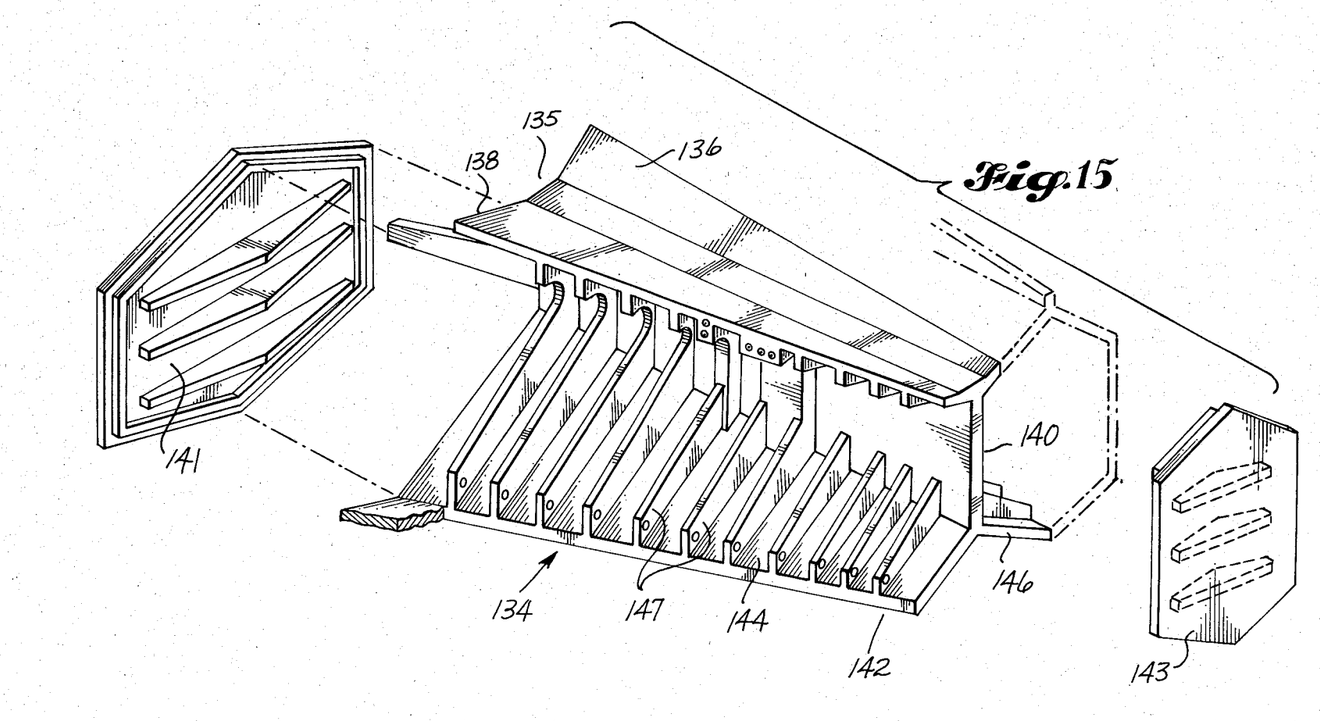
FIG. 15 is a pictorial view of a module of the type used in the lower flotation tier of cells.

FIG. 15 shows a typical construction of one of the modules used for constructing the flotation cells of the lower tier 38. This module 134 comprises a dihedral top 135 consisting of side panels 136, 138, a vertical wall 140 and a lower dihedral 142 consisting of side panels 144, 146. A plurality of these modules 134 are connected together and to lower portions of modules of the type shown by FIGS. 12 and 13 to form the flotation cells except for their ends which are merely closed by end walls 141, 143. Preferably, the modules 134 are produced with reinforcing ribs, some of which are designated 147.

As described above in connection with FIG. 6, a flotation ring 65 is provided below the lower walkway 50. This flotation ring 65 comprises a ring of buoyant plastic foam or the like housed below the walkway surface 118, inwardly of a lower extension 120' of the walkway wall 120 and outwardly of the outer wall of the building. A three dimensional triangular compartment 148 exists below each floor 108 (FIG. 14). These compartments 148, in the modules which make up the cells C of the second tier 40, may also be filled with a flotation foam material.

The buoyant foam plastic ring 65, and the buoyant material in the compartments 148, provide a static flotation control. If the building 10 starts to sink, this flotation material will be moved downwardly and the buoyant force which it produces will increase, wanting to force the building 10 upwardly.

Figures 16, 18:
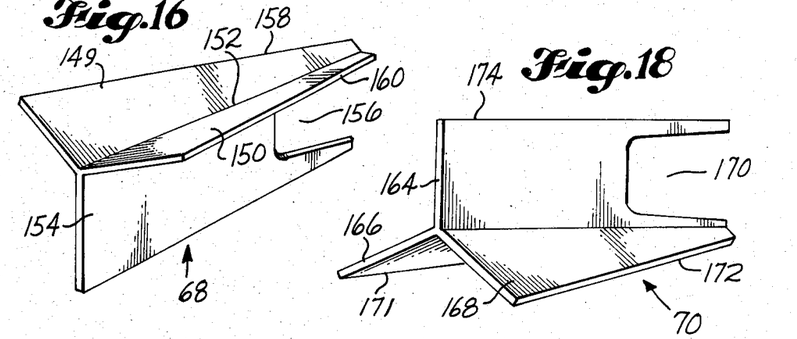
FIG. 16 is a pictorial view of a modified form of building unit, with detail omitted.
FIG. 18 is a pictorial view of a second modified form of the building unit, with detail omitted.

In accordance with an aspect of the invention, the flotation cells of the lower tier 38 provide a dynamic control of the buoyancy force. Referring to FIG. 18, in a typical system, every third flotation cell FC1 may be connected to a water line BC1. The cells FC2 immediately to one side of each of the cells FC1 may be connected to a second water line BC2. The remaining cells may be completely empty of water. The empty cells FC3 will together with the flotation ring 65 and the flotation compartments 148 provide a static buoyancy force, always acting to want to raise the building 10 in the water. Water can be pumped into and out from the cells BC1 and BC2 for adding ballast to the building. In a typical building 10, the amount of static buoyancy provided by the buoyancy ring 65, the buoyant material in the compartment 148, and the empty flotation cells FC3 may maintain the flotation level of the building at the desired location. As will be evident, when boats are removed from the upper tiers of building 10, the total weight of the building 10 is lessened and the buoyancy ring 66, the buoyancy compartments 148, and the flotation cells FC3 will together produce an excess buoyancy force. At that time, it becomes desirable to pump water into the flotation cells FC1 and/or FC2, in order to increase the building weight and restore the correct flotation level.

Figure 9:
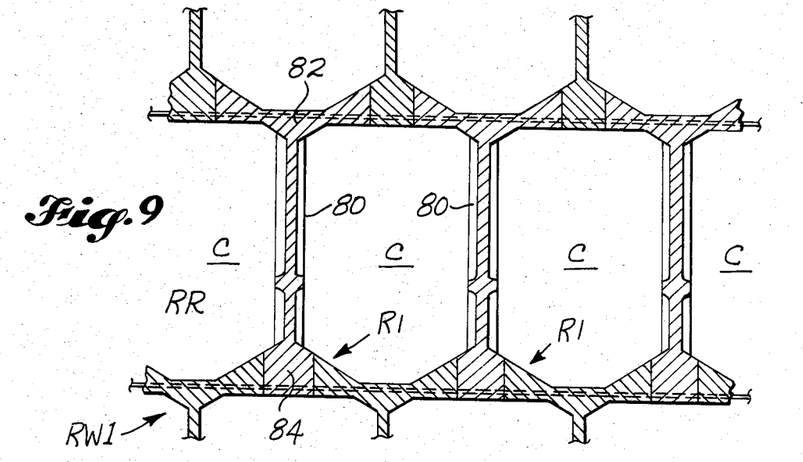
FIG. 9 is a cross sectional view taken substantially along line 9—9 of FIG. 7, showing the reinforcement ring portions of the cells which are joined together to form a ring of rings at each tier of cells, and a cylindrical wall of rings from top to bottom of the structure.

As earlier mentioned, the structural system of the building 10 may include segment post-tensioning cables which collectively extend circumferentially about the building 10. These cables are incorporated into the horizontal regions of the reinforcing rings RR1 and RR2. These cables are shown in FIGS. 6, 7 and 9 and are designated 56, 58, and 60.

FIGS. 11 and 12 show apparatus which may be provided in the cells C for supporting a boat B. As best shown by FIG. 12, the supports are connected to the sidewalls of the cells C. Each support 122 comprises a boat contacting strap portion 124 having an upper end connected to a wall attachment 126, and a lower end connected to the outer end 128 of a rigid support arm 130. The inner end of the support arm is pivotally attached to the base of the vertical wall (e.g. wall 132 in FIG. 11). FIG. 12 shows the manner that the boat B is supported on the straps 124. The hinge connection of the arms 130 to the sidewall structure makes it possible to swing the arm 130 upwardly and against the sidewall when they are not needed. A suitable lock mechanism (not shown) may be provided for securing the arm 170 to the sidewall. When the arms 130 are positioned against the sidewalls, the straps 122 are in a folded position between the arm 130 and the sidewall.

Figure 17:
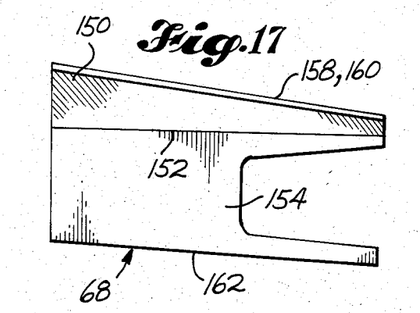
FIG. 17 is a side elevational view of the building unit shown by FIG. 16.

FIGS. 16 and 17 show a first modified form of the building unit, designated 68. Unit 68 is of trihedral form and has a upper dihedral portion defined by a pair of side members 149, 150 which are connected together at a valley line 152. Building unit 68 includes a vertical wall 154 having an upper edge which is connected to the side members 149, 150 at the valley line 152. The inboard portion of building unit 68 is open at 156, so that a tier of cells constructed by use of the building units 68 will include the same type of annular space surrounding the center opening 34 that is defined by the building units 66 described above.

Referring to FIG. 17, in this embodiment the floor of each cell is defined by the two sidewall sections 149, 152. The valley 152 is preferably horizontal. The outer edges 158, 160 of the wall sections 149, 152 must lie within radial planes and the lower edge 162 of vertical wall 154 must be positioned to meet and be connectable to a pair of walls 149, 152 of two building units 68 positioned below the wall 154. As a result, when building unit 68 is viewed in side elevation, with valley line 152 extending horizontally, the wall section 158, 160, 162 slope downwardly from the outer end of building unit 68 to the inner end of building unit 68.

Figure 19:
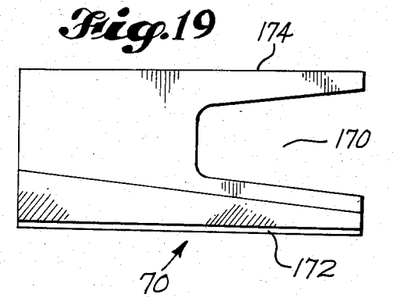
FIG. 19 is a side elevational view of the module shown by FIG. 18.
Figure 20:
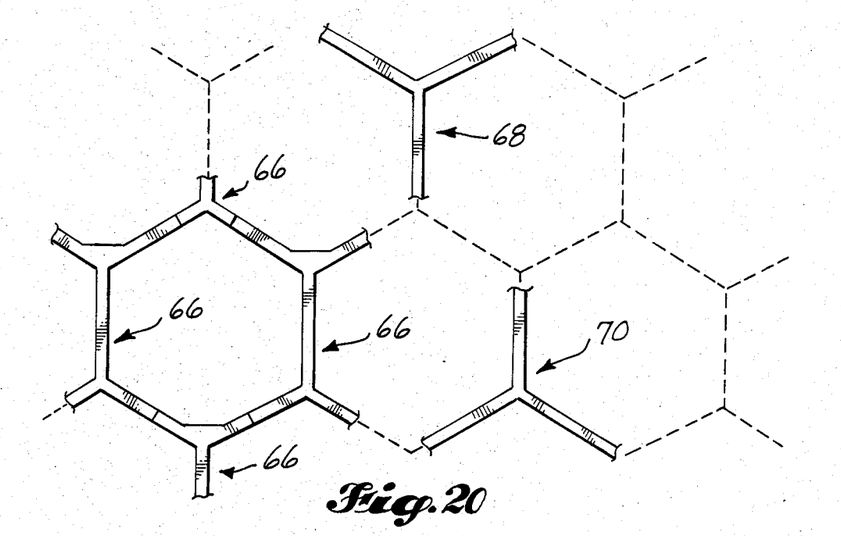
FIG. 20 is a view showing a honeycomb pattern on which the three types of building units are positioned.

Referring to FIGS. 18 and 19, building unit 70 is also of trihedral form. However, its vertical wall 164 is positioned above the lateral walls 166, 168. Building unit 70 includes an opening region 170 in the inboard portion of the vertical wall 164, for the same reason that building units 66 and 68 include open regions in their vertical wall sections.

The building units 70 are constructed in such a manner that the outer edges 171, 172 of wall section 166, 168 both lie on radial lines and are level. As a result, the upper edge 174 of wall section 164 is level and is parallel to the edges 171, 172, but the intersection of walls 164, 166, 168 occurs along a line 176 which slopes downwardly from the outer to the inner end of the building unit 70.

Building units 68, 70 can be constructed to include reinforcing ring sections. The vertical walls 106, 116 can be formed to provide storage space. Also, suitable end walls are provided for the building units 68, 70.

The elevator/turntable 36 is not illustrated. However, it may comprise a circular base, a plurality of columns connected to and extending upwardly from the base, and a pair of spaced apart floor sections at each level connected to the columns. The floor sections are "D" shaped opposite side portions of a circle separated by an open space. The floor sections and the open spaces are vertically aligned to define an elevator shaft between the floor sections. The outer edges of the floor sections ride on rollers mounted at the inner ends of the cells. The base is located below the bottom of the tunnel so that a boat entering through the tunnel can also enter into the elevator shaft space. A suitable elevator mechanism can be made to move up and down in the elevator space. When the elevator reaches a particular level it and the two floor sections complete an entire floor at that level.

As described above, the building structure 10 is post-tensioned in the annular direction, by use of the post-tensioned cables 56, 58, 60, 62. The individual cell units or modules are prestressed in the radial direction. That is, prestressing or pre-tensioning cables extend radially through the upper and lower dihedrals and through the vertical wall. It is desirable, and one aspect of the invention, to keep the building materials in compression everywhere that is exposed to seawater, in order to keep cracks closed and in this manner prevent or at least minimize corrosion of the steel.

As will be appreciated, the various principles and concepts which have been described can be used separately or together in a number of combinations or configurations to provide a multiplicity of useful structures, each embodying one or more aspects of the invention. For example, the illustrated embodiment is an annular building having four useful stories and eighteen cells or rooms per story. In other installations, it may be desirable to have more or less stories and/or more or less cells per story, or the shape of the structure may be changed. Variations in shape of the cells (and hence the building structure) can be easily obtained by minor variations in the forms that are used to mold the basic structural element or module. Referring to FIGS. 13 and 19, the taper of the unit that is illustrated is determined by the chosen shape of the structure. The tunnel cross-section may be revised from a closed shape, as illustrated (letter "O") to an open top shape (letter "U"). Also, in a given installation, it may be desired to locate a second tunnel diametrically opposite the first tunnel. Or, the building could be built as two crescents opening towards each other, giving the building in plan form the appearance of a pair of parentheses. This type of construction could be exaggerated so that the gap(s) occupied by the tunnel(s) is(are) more than a cell width, so that boats may be capable of passing each other in-/outbound in the tunnel(s), or to enhance view rights through the structure, or because of a structural advantage. It may be desirable to construct a building of cells connected together both horizontally and vertically, in a honeycomb fashion, in which the fashion is in the form of a single crescent in which the curvature both inside and outside is relatively flat. It should be observed that if the radius of the inner core were to be increased without limit, the building would be rectangular. A two-part building would become a pair of rectangular parts facing each other.

The concept of a flotation lower portion supporting a plurality of boat storage levels can be incorporated into a rectangular building composed of storage cells having parallel walls (i.e. the cells do not taper). The boats would be inserted into and removed out from one end of the cells. The building could have a bottom flotation portion, a first level for floating boats (e.g. wood boats), a top level for sailboats, and intermediate levels for dry storage of plastic boats. As stated above, the cells in such a building could be constructed from building units of the type illustrated but with side boundaries which are parallel.

What is claimed is:

1. In a building, a cell construction, comprising:
    wall means defining a hexahedral building cell which narrows in width from a first end to a second end,
    said wall means comprising a pair of spaced apart vertical sidewalls which converge together from the first to the second end of the cell,
    said wall means further including a pair of top sections which slope upwardly and inwardly from the sidewalls of the cell to an apex whereat they are connected together,
    a pair of bottom sections which slope downwardly and inwardly from the sidewalls of the cell to a valley whereat they are connected together,
    each said vertical sidewall including an inboard end located between the first and second ends of the cell, and
    said wall means defining an upper and a lower cantilever beam on each side of the cell, each projecting from the inboard end boundary of a vertical sidewall towards the second end of the cell,
    with the regions located vertically between the upper and lower cantilever beams and horizontally between the inboard ends of the vertical sidewalls and the second end of the cell being open regions in the vertical sidewalls.

2. A cell construction according to claim 1, wherein a reinforcement ring is provided in the cell at the inboard ends of the vertical sidewalls, said reinforcement ring extending about the girth of the cell and comprising thickened portions of the sidewalls, the top sections and the bottom sections.

3. A cell construction according to claim 2, comprising a second reinforcing ring extending about the girth of the cell, between the first reinforcing ring and the first end of the cell.

4. A cell construction according to claim 3, wherein each sidewall of the cell, in the region between the second reinforcing ring and the first end of the cell, comprises a storage region defined by vertically spaced apart top walls bounded on one side by a vertical wall and open on the opposite side.

5. A building cell construction according to claim 2, wherein each sidewall of the cell, in a region between the reinforcing ring and the first end of the cell, comprises a storage region defined by vertically spaced apart top walls bounded on one side by a vertical wall and open on the opposite side.

6. A building cell construction according to claim 1, wherein each sidewall of the cell, in the region between the inboard end of the vertical wall and the first end of the cell, comprises a storage region defined by vertically spaced apart top walls bounded on one side by a vertical wall and open on the opposite side.

7. A building cell construction according to claim 1, wherein said cell is defined by portions of four substantially identical building cell units, each said building cell unit comprising one of the vertical sidewalls of the cell, an upper dihedral portion and a lower dihedral portion, with the top of the cell being formed by the lower dihedral portion of a said building unit and adjoining side portions of the upper dihedral portions of second and third building units, and with the bottom being formed by the upper dihedral portion of a fourth building unit and adjoining side portions of the lower dihedral units of the second and third building units.

8. A building cell construction according to claim 7, wherein each said building cell unit comprises an end wall at the first end of the cell and a section of a walkway outwardly of said end wall.

9. A building cell construction according to claim 8, comprising an access opening in the end wall.

10. In a building, a plurality of building cells in honeycomb juxtaposition; each said cell involving a cell construction, comprising:
wall means comprising a pair of spaced apart vertical sidewalls which converge together from the first to the second end of the cell,
said wall means further including a pair of top sections which slope upwardly and inwardly from the sidewalls to an apex whereat they are connected together,
a pair of bottom sections which slope downwardly and inwardly from the vertical sidewalls to a valley whereat they are connected together,
each said vertical sidewall including an inboard end located between the first and second ends of the cell, and
said wall means defining an upper and a lower cantilever beam on each side of the cell, each projecting from the inboard end boundary of a vertical sidewall towards the second end of the cell,
with the regions located vertically between the upper and lower cantilever beams and horizontally between the inboard ends of the vertical sidewalls and the second end of the cell being open regions in the vertical sidewalls.

11. A cell construction according to claim 10, wherein a reinforcement ring is provided in each cell at the inboard ends of the vertical sidewalls, said reinforcement ring extending about the girth of the cell and comprising thickened portions of the sidewalls, the top sections and the bottom sections.

12. A cell construction according to claim 11, wherein the reinforcement rings of adjacent cells are connected together to form a wall of reinforcement rings at the inboard ends of the vertical walls.

13. A cell construction according to claim 11, comprising a second reinforcing ring extending about the girth of the cell, between the first reinforcing ring and the first end of the cell.

14. A cell construction according to claim 13, wherein the reinforcement rings of adjacent cells are connected together to form a wall of reinforcement rings at the inboard ends of the vertical walls.

15. A cell construction according to claim 13, wherein each sidewall of the cell, in the region between the second reinforcing ring and the first end of the cell, comprises a storage region defined by vertically spaced apart top walls bounded on one side by a vertical wall and open on the opposite side.

16. A building cell construction according to claim 11, wherein each sidewall of the cell, in a region between the reinforcing ring and the first end of the cell, comprises a storage region defined by vertically spaced apart top walls bounded on one side by a vertical wall and open on the opposite side.

17. A building cell construction according to claim 10, wherein each sidewall of the cell, in the region between the inboard end of the vertical wall and the first end of the cell, comprises a storage region defined by vertically spaced apart top walls bounded on one side by a vertical wall and open on the opposite side.

18. A building cell construction according to claim 10, wherein said cell is defined by portions of four substantially identical building cell units, each said building cell unit comprising one of the vertical sidewalls of the cell, an upper dihedral portion and a lower dihedral portion, with the top of the cell being formed by the lower dihedral portion of a said building unit and adjoining side portions of the upper dihedral portions of second and third building units, and with one bottom being formed by the upper dihedral portion of a fourth building unit and adjoining side portions of the lower dihedral units of the second and third building units.

19. A building cell construction according to claim 18, wherein each said building unit comprises an end wall section at the first end of the cell and a section of a walkway outwardly of said end wall, said end wall sections being connected together to form a wall for the building at the first ends of the cells and with the walkway sections of horizontally adjoining building units together forming a continuous walkway.

20. A building cell construction according to claim 19, comprising an access opening in each end wall section.

21. An annular building having a central opening and a plurality of tiers of hexahedral building cells in honeycomb juxtaposition surrounding said central opening, and a cell construction comprising:
wall means defining the building cells, each said building cell narrowing in width from a first outer end to a second inner end,
said wall means comprising a pair of spaced apart vertical sidewalls for each cell which converge together from the first to the second end of the cell,
said wall means further including a pair of top sections for each cell which slope upwardly and inwardly from the sidewalls of the cells to an apex whereat they are connected together, a pair of bottom sections for each cell which slope downwardly and inwardly from the sidewalls of the cell to a valley whereat they are connected together, each said vertical sidewall including an inboard end located between the first and second ends of the cell, and said wall means defining an upper and a lower cantilever beam on each side of each cell, each projecting from the inboard end boundary of a vertical sidewall towards the second end of the cell, with the regions located vertically between the upper and lower cantilever beams and horizontally between the inboard ends of the vertical sidewalls and the second end of the cell being open regions in the vertical sidewalls.

22. A cell construction according to claim 21, wherein a reinforcement ring is provided in each cell at the inboard ends of the vertical sidewalls, said reinforcement ring extending about the girth of the cell and comprising thickened portions of the sidewalls, the top sections and the bottom sections.

23. A cell construction according to claim 22, wherein the reinforcement rings of adjacent cells are connected together to form a wall of reinforcement rings at the inboard ends of the vertical walls.

24. A cell construction according to claim 21, comprising a second reinforcing ring extending about the girth of the cell, between the first reinforcing ring and the first end of the cell.

25. A cell construction according to claim 24, wherein the reinforcement rings of adjacent cells are connected together to form a wall of reinforcement rings at the inboard ends of the vertical walls.

26. A cell construction according to claim 24, wherein each sidewall of the cell, in the region between the second reinforcing ring and the first end of the cell, comprises a storage region defined by vertically spaced apart top walls bounded on one side by a vertical wall and open on the opposite side.

27. A building cell construction according to claim 22, wherein each sidewall of the cell, in a region between the reinforcing ring and the first end of the cell, comprises a storage region defined by vertically spaced apart top walls bounded on one side by a vertical wall and open on the opposite side.

28. A building cell construction according to claim 21, wherein each sidewall of the cell, in the region between the inboard end of the vertical wall and the first end of the cell, comprises a storage region defined by vertically spaced apart top walls bounded on one side by a vertical wall and open on the opposite side.

29. A building cell construction according to claim 21, wherein each said building comprises a plurality of interconnected substantially identical building units, and each said cell is defined by portions of four of said building cell units, each said building cell unit comprising one of the vertical sidewalls of the cell, an upper dihedral portion and a lower dihedral portion, with the top of the cell being formed by the lower dihedral portion of a said building unit and adjoining side portions of the upper dihedral portions of second and third building units, and with the bottom being formed by the upper dihedral portion of a fourth building unit and adjoining side portions of the lower dihedral units of the second and third building units.

30. A building cell construction according to claim 29, wherein each said building unit comprises an end wall section at the first end of the cell and a section of a walkway outwardly of said end wall, said end wall sections being connected together to form a wall for the building at the first ends of the cells and with the walkway sections of horizontally adjoining building units together forming a continuous walkway.

31. A building cell construction according to claim 30, comprising an access opening in the end wall.

32. A building structure comprising wall means defining an annulus of inwardly tapering hexahedral building cells joined together vertically and horizontally in honeycomb juxtaposition, with the inner end boundaries of the cells defining a vertical generally central opening in the building structure, each said cell including a pair of spaced apart vertical sidewalls, with the inner portions of the sidewalls being open and the openings being defined top and bottom by horizontally extending cantilever beams, said sidewall openings and said cantilever beams defining a generally annular space at the inner ends of the cells surrounding the generally central opening in the building structure; and elevator means within said central opening.

33. A building structure according to claim 32, wherein the building is a storage structure for boats and is located within a body of water and includes a radial tunnel opening extending through a sidewall portion of the annulus, to provide a passageway for boats.

34. A building structure according to claim 33, comprising a bottom tier of flotation cells.

35. A building structure according to claim 34, comprising means for introducing water into and removing water out from at least some of the flotation cells, for adjusting the vertical position of the building structure in the body of water.

36. A building cell unit connectable both horizontally and vertically to additional building cell units of the same construction for forming a plurality of building cells which are connected together horizontally and vertically, each said building cell unit comprising a vertical wall which in use forms a sidewall for two adjacent cells, an upper dihedral portion and a lower dihedral portion, configured so that when a plurality of such building units are connected together the top of each cell is formed by the lower dihedral portion of a first building unit and adjoining side portions of the upper dihedral portions of second and third building units, and the bottom of each cell is formed by the upper dihedral portion of a fourth building unit and adjoining side portions of the lower dihedral portions of the second and third building units.

37. A building cell unit according to claim 36, comprising an end wall at one of its ends.

38. A building cell unit according to claim 37, comprising a section of a walkway outwardly of the end wall.

39. A building cell construction according to claim 38, comprising an access opening in the end wall.

* * * * *